US012621121B2

(12) United States Patent
Shin et al.

(10) Patent No.: US 12,621,121 B2
(45) Date of Patent: May 5, 2026

(54) DATA MANAGEMENT METHOD AND APPARATUS USING HOMOMORPHIC ENCRYPTION LOOKUP TABLE

(71) Applicant: CRYPTO LAB INC., Seoul (KR)

(72) Inventors: Junbum Shin, Suwon-si (KR); Jung Woo Kim, Seoul (KR); Sumin Lee, Seoul (KR); Seewoo Lee, Chungju-si (KR)

(73) Assignee: CRYPTO LAB INC., Seoul (KR)

( * ) Notice: Subject to any disclaimer, the term of this patent is extended or adjusted under 35 U.S.C. 154(b) by 200 days.

(21) Appl. No.: 18/501,632

(22) Filed: Nov. 3, 2023

(65) Prior Publication Data

US 2024/0154785 A1     May 9, 2024

(30) Foreign Application Priority Data

Nov. 7, 2022     (KR) ........................ 10-2022-0147353
Dec. 13, 2022     (KR) ........................ 10-2022-0174208

(51) Int. Cl.
*H04L 9/00* (2022.01)
*H04L 9/32* (2006.01)
(52) U.S. Cl.
CPC ............ *H04L 9/008* (2013.01); *H04L 9/3242* (2013.01)
(58) Field of Classification Search
CPC .............................. H04L 9/008; H04L 9/3242
See application file for complete search history.

(56) References Cited

U.S. PATENT DOCUMENTS

| | | | | |
|---|---|---|---|---|
| 10,447,661 B1 * | 10/2019 | Miller | ................. | H04L 63/0428 |
| 11,249,999 B2 | 2/2022 | Colgrove et al. | | |
| 2009/0043741 A1 | 2/2009 | Kim | | |
| 2019/0095490 A1 * | 3/2019 | Colgrove | ........... | G06F 16/2255 |
| 2020/0142692 A1 * | 5/2020 | Abadi | ................... | G06F 16/903 |

FOREIGN PATENT DOCUMENTS

| | | | | |
|---|---|---|---|---|
| CN | 105302838 A | * | 2/2016 | |
| KR | 20100068382 A | | 6/2010 | |
| KR | 20170028825 A | | 3/2017 | |

OTHER PUBLICATIONS

Office Action issued for Korean Patent Application No. 10-2022-0174208 filed on Dec. 13, 2022 on behalf of Crypto Lab Inc. Issuance date: Mar. 13, 2025. 15 pages (original with English translation).

* cited by examiner

*Primary Examiner* — Ayoub Alata
(74) *Attorney, Agent, or Firm* — Steinfl + Bruno LLP

(57)     ABSTRACT

Disclosed is a data management method and apparatus. The data management method includes: obtaining a hash value of a key by using a predetermined hash function for each of a plurality of data in which the key matches a data value, sorting the plurality of data in which the key is changed to the hash value of the key based on the obtained hash value, classifying the plurality of sorted data into a plurality of groups according to a predetermined criterion; encoding the plurality of data classified into the plurality of groups, and generating a lookup table based on a predetermined hash value included in each of the plurality of classified groups.

16 Claims, 10 Drawing Sheets

Sorting Hash Values Of Keys

Encoding Hash Values Of Keys

| $(k'_1)_0$ | $(k'_1)_1$ | $(k'_1)_2$ | $(k'_1)_3$ | ~17-1 |
|---|---|---|---|---|
| ... | ... | ... | ... | |
| $(k'_m)_0$ | $(k'_m)_1$ | $(k'_m)_2$ | $(k'_m)_3$ | |

| $(k'_7)_0$ | $(k'_7)_1$ | $(k'_7)_2$ | $(k'_7)_3$ | ~17-2 |
|---|---|---|---|---|
| ... | ... | ... | ... | |
| $(k'_{m+1})_0$ | $(k'_{m+1})_1$ | $(k'_{m+1})_2$ | $(k'_{m+1})_3$ | |

...

| $(k'_2)_0$ | $(k'_2)_1$ | $(k'_2)_2$ | $(k'_2)_3$ | ~17-n |
|---|---|---|---|---|
| ... | ... | ... | ... | |
| $(k'_n)_0$ | $(k'_n)_1$ | $(k'_n)_2$ | $(k'_n)_3$ | |

30

| $(k'_1)_0$ | $(k'_1)_1$ | $(k'_1)_2$ | $(k'_1)_3$ |
|---|---|---|---|
| $(k'_7)_0$ | $(k'_7)_1$ | $(k'_7)_2$ | $(k'_7)_3$ |
| ... | ... | ... | ... |
| $(k'_2)_0$ | $(k'_2)_1$ | $(k'_2)_2$ | $(k'_2)_3$ |

Generating A Lookup Table

· · ·

Storing Data

30

| $(k'_1)_0$ | $(k'_1)_1$ | $(k'_1)_2$ | $(k'_1)_3$ |
|---|---|---|---|
| $(k'_7)_0$ | $(k'_7)_1$ | $(k'_7)_2$ | $(k'_7)_3$ |
| ... | ... | ... | ... |
| $(k'_2)_0$ | $(k'_2)_1$ | $(k'_2)_2$ | $(k'_2)_3$ |

60

| $(q'_1)_0$ | $(q'_1)_1$ | $(q'_1)_2$ | $(q'_1)_3$ |
|---|---|---|---|

Retrieving Data

Retrieving Data

DATA MANAGEMENT METHOD AND APPARATUS USING HOMOMORPHIC ENCRYPTION LOOKUP TABLE

CROSS-REFERENCE TO RELATED APPLICATIONS

The present application claims priority to Korean Patent Application No. 10-2022-0147353 filed on Nov. 7, 2022, and Korean Patent Application No. 10-2022-0174208 filed on Dec. 13, 2022, the disclosures of all of which are incorporated herein by reference in their entirety.

BACKGROUND

Field

Apparatuses and methods consistent with the disclosure relate to a data management method and apparatus, and more particularly, to a data management method and apparatus using a homomorphic encryption lookup table for easily retrieving data corresponding to a query.

Description of the Related Art

There is an increasing demand for collecting and managing data scattered in various information providing organizations using an integrated database management system. For information protection, the system may manage an encrypted database by using a method such as homomorphic encryption.

In general, a decryption process for whole data is required to retrieve data according to a client's request. However, there is a problem in that data decrypted for retrieval may be exposed to external risks. A homomorphic encryption technology may be applied to enable data retrieval in an encrypted state to protect data from external risks. However, a retrieval method using an existing homomorphically encrypted lookup table has difficulty in reducing a retrievable range while guaranteeing safety of 128-bit or more. In addition, the retrieval method using the homomorphically encrypted lookup table has a problem in that a retrieval time linearly increases as the number of records in the lookup table increases.

SUMMARY

The disclosure provides a data management method and apparatus using a homomorphic encryption lookup table for quickly retrieving encrypted data regardless of a type of an encrypted query.

According to an embodiment of the disclosure, a data management method includes: obtaining a hash value of a key by using a predetermined hash function for each of a plurality of data in which the key matches a data value; sorting the plurality of data in which the key is changed to the hash value of the key based on the obtained hash value; classifying the plurality of sorted data into a plurality of groups according to a predetermined criterion; encoding the plurality of data classified into the plurality of groups; and generating a lookup table based on a predetermined hash value included in each of the plurality of classified groups.

The data management method may further include encrypting the plurality of encoded data.

In the classifying of the plurality of sorted data into the plurality of groups, the plurality of data may be classified based on the hash value or the number of hash values.

In the encoding, bits of a hash value of each of the plurality of data may be divided into a predetermined number, and the divided bits may be allocated to each slot.

In the generating of the lookup table, obtaining a first hash value included in the last position within a preset group among the plurality of groups, obtaining a second hash value included in the foremost position within a group next to the preset group, and generating the lookup table including any one of the obtained first hash value and the obtained second hash value.

The data management method may further include: receiving a data retrieval query from an external apparatus; obtaining a hash value of the retrieval query from the received retrieval query by using the predetermined hash function; encoding the obtained hash value of the retrieval query; and obtaining a corresponding data value based on the encoded hash value of the retrieval query.

In the obtaining of the data value, one of the plurality of groups may be determined based on the obtained hash value of the retrieval query and the hash values of the keys included in the lookup table.

In the obtaining of the data value, bits of the hash value of the retrieval query may be divided into a predetermined number, the divided bits may be allocated to each slot, and bits of a slot to which the hash value of the retrieval query is allocated may be compared with bits of a slot to which the hash value of each of the plurality of data included in the determined group is allocated by using a homomorphic encryption comparison operation on a slot-by-slot basis.

In the obtaining of the data value, in a case where the bits of the slot to which the hash value of the retrieval query is allocated coincide with the bits of the slot to which the hash value of the data included in the determined group is allocated, a comparison result value of 1 may be obtained, and in a case where an AND operation result value obtained by performing an AND operation on the comparison result value obtained from each slot is 1, the data value may be obtained by multiplying a data value matching the hash value of the data by the AND operation result value.

According to an embodiment of the disclosure, an electronic apparatus includes: a communication interface; and a processor, in which the processor is configured to obtain a hash value of a key by using a predetermined hash function for each of a plurality of data in which the key matches a data value, sort the plurality of data in which the key is changed to the hash value of the key based on the obtained hash value, classify the plurality of sorted data into a plurality of groups according to a predetermined criterion, encode the plurality of data classified into the plurality of groups, and generate a lookup table based on a predetermined hash value included in each of the plurality of classified groups.

The processor may be configured to encrypt the plurality of encoded data.

The processor may be configured to classify the plurality of data based on the hash value or the number of hash values.

The processor may be configured to divide bits of a hash value of each of the plurality of data into a predetermined number and allocate the divided bits to each slot. The processor may be configured to obtain a first hash value included in the last position within a preset group among the plurality of groups, obtain a second hash value included in the foremost position within a group next to the preset group, and generate the lookup table including any one of the obtained first hash value and the obtained second hash value.

The processor may be configured to control the communication interface to receive a data retrieval query from an external apparatus, obtain a hash value of the retrieval query from the received retrieval query by using the predetermined hash function, encode the obtained hash value of the retrieval query, and obtain a corresponding data value based on the encoded hash value of the retrieval query.

The processor may be configured to determine one of the plurality of groups based on the obtained hash value of the retrieval query and the hash values of the keys included in the lookup table.

The processor may be configured to divide bits of the hash value of the retrieval query into a predetermined number, allocate the divided bits to each slot, and compare bits of a slot to which the hash value of the retrieval query is allocated with bits of a slot to which the hash value of each of the plurality of data included in the determined group is allocated by using a homomorphic encryption comparison operation on a slot-by-slot basis.

The processor may be configured to obtain a comparison result value of 1 in a case where the bits of the slot to which the hash value of the retrieval query is allocated coincide with the bits of the slot to which the hash value of the data included in the determined group is allocated, and may be configured to obtain the data value by multiplying a data value matching the hash value of the data by an AND operation result value in a case where the AND operation result value obtained by performing an AND operation on the comparison result value obtained from each slot is 1.

According to various embodiments of the disclosure as described above, the data management method and the electronic apparatus may quickly retrieve encrypted data regardless of a type of a query.

Effects of the disclosure are not limited to the effects described above, and other effects that are not mentioned may be obviously understood by those skilled in the art from the following description.

DETAILED DESCRIPTION

Figure 1:
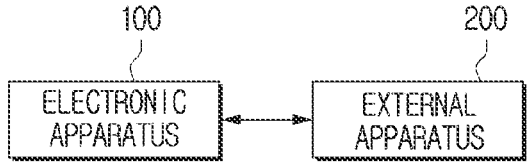
FIG. 1 is a diagram for describing a data management system according to an embodiment of the disclosure.

Hereinafter, various embodiments will be described in more detail with reference to the accompanying drawings.

Embodiments mentioned in the specification may be variously modified. A specific embodiment may be illustrated in the drawings and be described in detail in a detailed description. However, the specific embodiment illustrated in the accompanying drawings is provided only to allow various embodiments to be easily understood. Therefore, it should be understood that the spirit of the disclosure is not limited by the specific embodiment illustrated in the accompanying drawings, and includes all the equivalents and substitutions included in the spirit and the scope of the disclosure.

Terms including ordinal numbers such as "first", "second", and the like, may be used to describe various components. However, these components are not limited by these terms. These terms are used only to distinguish one component from another component.

It should be further understood that terms "include" or "have" used in the specification specify the presence of features, numerals, steps, operations, components, parts mentioned in the specification, or combinations thereof, but do not preclude the presence or addition of one or more other features, numerals, steps, operations, components, parts, or combinations thereof. It is to be understood that in case that one component is referred to as being "connected to" or "coupled to" another component, one component may be connected directly to or coupled directly to another component or be connected to or coupled to another component with the other component interposed therebetween. On the other hand, it is to be understood that in case that one component is referred to as being "connected directly to" or "coupled directly to" another component, it may be connected to or coupled to another component without the other component interposed therebetween.

Meanwhile, a term "module" or "-er/-or" for components used in the specification performs at least one function or operation. In addition, a "module" or a "-er/-or" may perform a function or an operation by hardware, software, or a combination of hardware and software. In addition, a plurality of "modules" or a plurality of "-ers/-ors" except for a "module" or a "-er/-or" performed by specific hardware or performed by at least one processor may be integrated in at least one module. Singular forms are intended to include plural forms unless the context clearly indicates otherwise.

In the description of the disclosure, the order of each step should be understood to be non-limiting, unless the preceding step must be performed logically and temporally before the following step. In other words, except for the exceptional case above, even if the process described in the following step is performed before the process described in the preceding stage, the nature of the disclosure is not affected and the scope of the right should be defined regardless of the order of the steps. Further, in the specification, "A or B" is defined to mean not only selectively indicating either one of A and B, but also including both A and B. In the specification, the term "including" has a meaning encompassing further including other components in addition to the included elements listed.

In the specification, only essential components necessary for the description of the disclosure are described, and components unrelated to the essence of the disclosure are not mentioned. Further, it should not be interpreted as an exclusive meaning that includes only the mentioned components, but should be interpreted as a non-exclusive meaning that may include other components.

Further, in describing the disclosure, in case that it is determined that a detailed description for known functions or configurations related to the disclosure may unnecessarily obscure the gist of the disclosure, the detailed description therefor will be abbreviated or omitted. Meanwhile, each embodiment may be implemented or operated independently, but each embodiment may be implemented or operated in combination.

FIG. 1 is a diagram illustrating a data management system according to an embodiment of the disclosure.

Referring to FIG. 1, the data management system may include an electronic apparatus 100 and an external apparatus 200. For example, the electronic apparatus 100 may include a server, a cloud, or the like that stores and manages an encrypted database. The external apparatus 200 may be a client apparatus requesting encrypted data stored in the electronic apparatus 100. According to an embodiment, the external apparatus 100 may include a smart phone, a tablet personal computer (PC), a notebook computer, a desktop computer, a navigation system, a television (TV), a set-top box, a kiosk, an external server, and an external cloud device.

The electronic apparatus 100 may store encrypted data and generate a lookup table for retrieving the stored encrypted data. For example, data may include a key and a data value matching the key. The electronic apparatus 100 may obtain a hash value of a key by using a hash function. The hash function may output a hash value of the same size (or bits) regardless of an input value. The electronic apparatus 100 may include a plurality of data and obtain a hash value of a key included in each of the plurality of data by using the hash function. The electronic apparatus 100 may sort the obtained hash values. According to an embodiment, the electronic apparatus 100 may sort the obtained hash values in descending order or ascending order. The electronic apparatus 100 may classify the sorted hash values into a plurality of groups. The electronic apparatus 100 may classify hash values or hash values obtained based on the number of hash values into a plurality of groups. According to an embodiment, the electronic apparatus 100 may classify hash values from 0 to 10000 as a first group and classify hash values from 10001 to 20000 as a second group. Alternatively, the electronic apparatus 100 may classify 20000 hash values as each group, and each group may include 20000 hash values. The electronic apparatus 100 may encode data classified into a plurality of groups. For example, in a case where a hash value obtained using the hash function is 160 bits, the electronic apparatus 100 may divide the hash value in units of 40 bits and allocate divided parts to four slots. The electronic apparatus 100 may generate the lookup table for retrieval. For example, the electronic apparatus 100 may obtain one hash value from each group according to a predetermined criterion and generate the lookup table by collecting the obtained hash values. According to an embodiment, the electronic apparatus 100 may generate the lookup table based on a hash value of a key at the foremost position or a hash value of a key at the rearmost position of each group. The lookup table may reduce a data retrieval range at the time of retrieving requested data corresponding to a query. The electronic apparatus 100 may encrypt data in units of classified group. The electronic apparatus 100 may encrypt and store hash values and data values matching the hash values for each group. However, the lookup table does not have to be encrypted. That is, the electronic apparatus 100 may classify hash values included in data and data values matching the hash values into a plurality of groups and perform encryption. Accordingly, the electronic apparatus 100 may protect data. The lookup table does not have to be encrypted. However, the lookup table includes only a hash value of a key of data, and the hash value is generated using a one-way hash function, and thus, data (or a value of data) may be protected even if leaked to the outside.

The external apparatus 200 may transmit a query requesting data to the electronic apparatus 100. The electronic apparatus 100 may check a location of encrypted data corresponding to the request query transmitted from the external apparatus 200, retrieve the encrypted data, and transmit the encrypted data to the external apparatus 200.

For example, the electronic apparatus 100 may obtain a hash value of a retrieval query from a received retrieval query by using a hash function. The hash function for obtaining a hash value of a retrieval query may be the same as the hash function for obtaining a hash value of a key. Therefore, a hash value of a key and a hash value of a retrieval query may have the same size (for example, the number of bits). The electronic apparatus 100 may encode a hash value of a retrieval query. That is, the electronic apparatus 100 may divide a hash value of a retrieval query into a plurality of units and allocate each divided part to a slot. The number of slots and the size (for example, the number of bits) of a divided hash value may be the same as the number and size of slots of a hash value of a key. The electronic apparatus 100 may compare hash values of keys included in the lookup table with a hash value of a retrieval query, and determine a group including a data value corresponding to the hash value of the retrieval query. The electronic apparatus 100 may identify a hash value of a key that coincides with the hash value of the retrieval query by comparing hash values of keys included in the determined group with the hash value of the retrieval query.

For example, the electronic apparatus 100 may perform a homomorphic cryptographic comparison operation on bits of each slot of a hash value of a key and corresponding bits of each slot of the hash value of the retrieval query to perform comparison on a slot-by-slot basis. The electronic apparatus 100 may identify a hash value of a key that coincides with bits of each slot of the hash value of the retrieval query. Then, the electronic apparatus 100 may obtain a data value matching the hash value of the key and transmit the data value to the external apparatus 200.

The electronic apparatus 100 may reduce the number of data to be retrieved by using the lookup table. In addition, the electronic apparatus 100 may reduce a comparison operation time by comparing a hash value of a key and a hash value of a retrieval query on a slot-by-slot basis. Therefore, the electronic apparatus 100 according to the disclosure may safely protect data and quickly retrieve a data value according to a request from the external apparatus 200.

Figure 2:
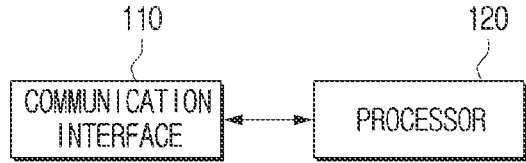
FIG. 2 is a block diagram for describing a configuration of an electronic apparatus according to an embodiment of the disclosure.

FIG. 2 is a block diagram illustrating a configuration of the electronic apparatus according to an embodiment of the disclosure.

Referring to FIG. 2, the electronic apparatus 100 may include a communication interface 110 and a processor 120.

The communication interface 110 may communicate with the external apparatus 200. The communication interface 110 may receive a retrieval query requesting data retrieval from the external apparatus 200 and transmit a retrieved data value to the external apparatus 200. For example, the communication interface 110 may communicate with the external apparatus 200 by at least one of communication manners such as Wi-Fi, Wi-Fi Direct, Bluetooth, Zigbee, 3$^{rd}$ generation (3G), 3$^{rd}$ generation partnership project (3GPP), and long term evolution (LTE). The communication interface 110 may be referred to as a communication apparatus, a communication unit, a communication module, a transceiver, or the like.

The processor 120 may control each component of the electronic apparatus 100. For example, the processor 120 may control the communication interface 110 to transmit and receive data to and from the external apparatus 200.

The processor 120 may obtain a hash value of a key of data by using the hash function. A key of data may match a corresponding data value. The processor 120 may sort acquired hash values of keys. According to an embodiment, the processor 120 may sort the obtained hash values of keys in descending order or ascending order. Since a hash value of a key corresponds to a key of data, a data value may also match the hash value of the key.

The processor 120 may classify hash values of keys sorted according to a predetermined criterion into a plurality of groups. For example, the processor 120 may classify obtained hash values of a plurality of keys based on the hash values or the number of hash values. The processor 120 may encode a hash value of each of a plurality of keys classified into a plurality of groups. For example, the processor 120 may divide bits of a hash value of each of a plurality of keys into a predetermined number and allocate the divided bits to each slot.

The processor 120 may generate the lookup table based on a predetermined hash value included in each of a plurality of classified groups. For example, the processor 120 may obtain a hash value of a key included in data at the foremost position or a hash value of a key included in data at the rearmost position in each of a plurality of groups and may generate the lookup table including the hash value of the key obtained from each of the plurality of groups.

The processor 120 may obtain a first hash value included in the last position (or rearmost position) within a preset group among the plurality of groups. The processor 120 may obtain a second hash value included in the foremost position (or first position) within a group next to the preset group. The processor 120 may generate the lookup table including any one the obtained first hash value and the obtained second hash value. The processor may generate the lookup table including any one of the obtained first hash value and the obtained second hash value, and data value between data corresponding to the first hash and data corresponding to the second hash.

The processor 120 may encrypt encoded data. That is, the processor 120 may match, encrypt, and store a data value corresponding to a hash value of each of a plurality of keys classified into a plurality of groups.

The processor 120 may obtain a hash value of the retrieval query from the received retrieval query by using a predetermined hash function based on the electronic apparatus 100 receiving a data retrieval query from the external apparatus. Then, the processor 120 may encode the obtained hash value of the retrieval query. For example, the processor 120 may divide bits of the hash value of the retrieval query into a predetermined number and allocate the divided bits to each slot. The number of divided bits and the number of slots of the hash value of the retrieval query may be the same as the number of divided bits and the number of slots of a hash value of a key.

The processor 120 may obtain a corresponding data value based on the encoded hash value of the retrieval query. The processor 120 may determine one of a plurality of groups based on the obtained hash value of the retrieval query and the hash values included in the lookup table. Then, the processor 120 may retrieve data by comparing hash values of keys included in the determined group with the hash value of the retrieval query. For example, the processor 120 may compare bits of a slot to which the hash value of the retrieval query is allocated with bits of a slot to which a hash value of each of a plurality of data included in the determined one group is allocated by using the homomorphic encryption comparison operation on a slot-by-slot basis. In a case where the bits of the slot to which the hash value of the retrieval query is allocated coincide with the bits of the slot to which the hash value of the key is allocated, a comparison result value of 1 may be obtained. Then, the processor 120 may perform an AND operation on the comparison result value of each slot. In a case where an AND operation result value obtained by performing the AND operation on the comparison result value obtained from each slot is 1, the processor 120 may multiply a data value matching the hash value of the key that is compared with the hash value of the retrieval query by the AND operation result value. Then, the processor 120 may acquire the data value.

The processor 120 may control the communication interface 110 to transmit the obtained data value to the external apparatus 200.

Hereinafter, a data management method for facilitating data retrieval in the electronic apparatus 100 will be described.

Figure 3:
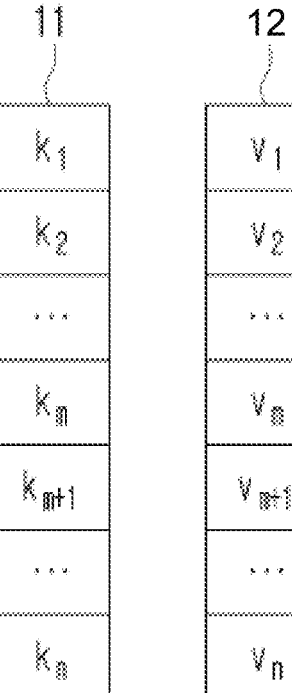
FIG. 3 is a diagram for describing stored keys and data values according to an embodiment of the disclosure.
Figure 4:
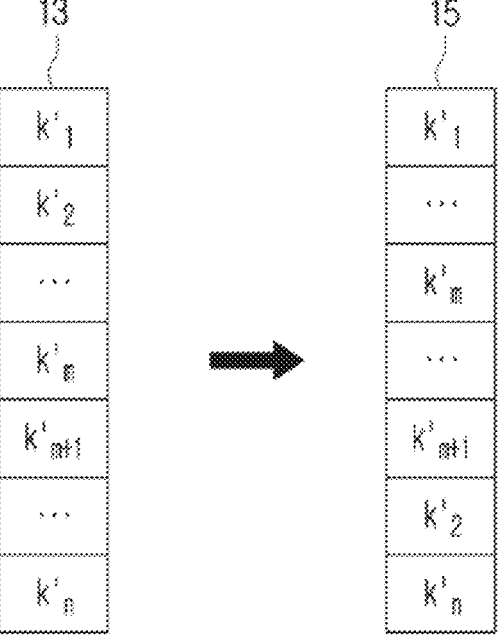
FIG. 4 is a diagram for describing a process of sorting hash values of keys according to an embodiment of the disclosure.
Figure 4:
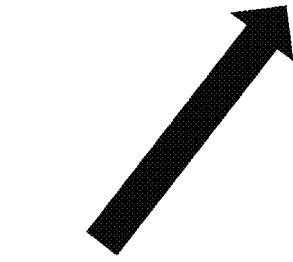
Figure 5:
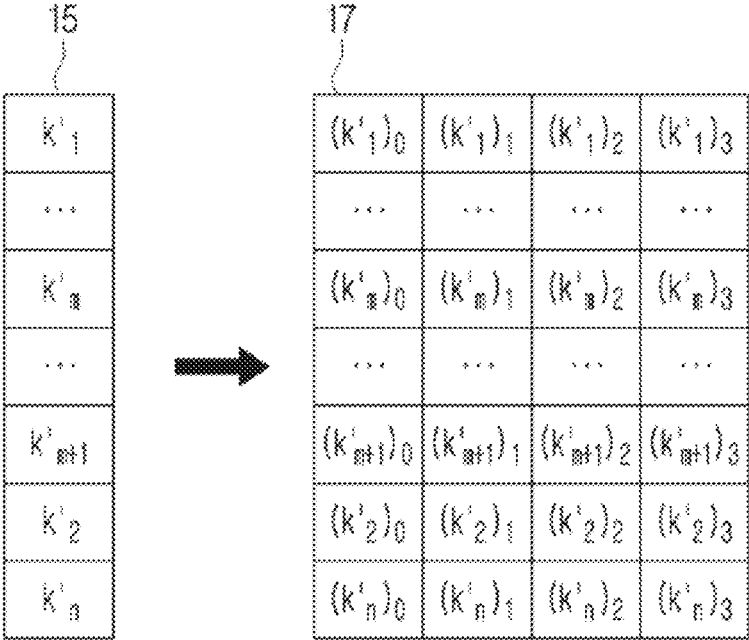
FIG. 5 is a diagram for describing a process of encoding hash values of keys according to an embodiment of the disclosure.
Figure 5:
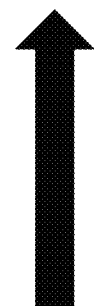
Figure 6:
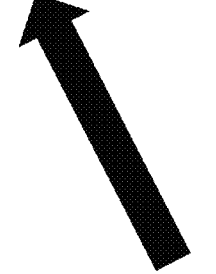
FIG. 6 is a diagram for describing a process of generating a lookup table according to an embodiment of the disclosure.
Figure 7:
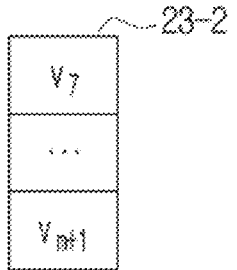
FIG. 7 is a diagram for describing a process of storing data according to an embodiment of the disclosure.
Figure 7:
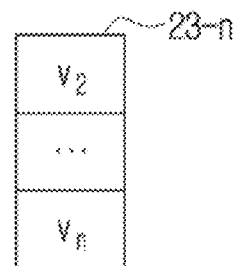
Figure 7:
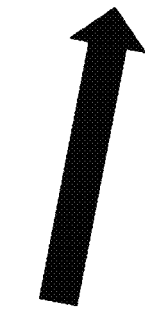

FIG. 3 is a diagram for describing stored keys and data values according to an embodiment of the disclosure, FIG. 4 is a diagram for describing a process of sorting hash values of keys according to an embodiment of the disclosure, FIG. 5 is a diagram for describing a process of encoding hash values of keys according to an embodiment of the disclosure, FIG. 6 is a diagram for describing a process of generating the lookup table according to an embodiment of the disclosure, and FIG. 7 is a diagram for describing a process of storing data according to an embodiment of the disclosure. A data management method of the electronic apparatus 100 will be described with reference to FIGS. 3 to 7.

FIG. 3 illustrates an example of data. Data may include a key set 11 (K={$k_i$}) and a data value set 12 (V={$v_i$}). Each key may match a corresponding data value. For example, a key $k_i$ may match a value $v_1$, and a key $k_n$ may match a value $v_n$. The electronic apparatus 100 may obtain a hash value of a key by using the hash function.

FIG. 4 illustrates a hash value set 13 corresponding to keys included in the key set 11. The electronic apparatus 100 may obtain a hash value of a key included in the key set 11 by using the hash function. In a case where the key set 11 is K={$k_i$}, the hash value set 13 corresponding to the keys may be expressed as Khash=K'={hash($k_i$)}={$k'_i$}. For example, a hash value of the key $k_i$ may be $k'_1$, and a hash value of the key $k_n$ may be $k'_n$.

The electronic apparatus 100 may sort the hash values of the keys. For example, the electronic apparatus 100 may sort the hash values of the keys in ascending or descending order. The electronic apparatus 100 may obtain a sorted hash value set 15 of the keys by sorting the hash values of the keys. According to an embodiment, in a case where $k'_1 < k'_m < k'_{m+1} < k'_2 < k'_n$, and the electronic apparatus 100 sorts the hash values of the keys in ascending order, the electronic apparatus 100 may obtain the sorted hash value set 15 of the keys as illustrated in FIG. 4. The electronic apparatus 100 may encode the hash values of the keys.

FIG. 5 illustrates an encoded hash value set 17 of the keys. A hash value of a key may be expressed by bits. The electronic apparatus 100 may divide bits of a hash value into a predetermined number and allocate the divided bits to each slot. For example, the electronic apparatus 100 may divide $k'_1$, which is the hash value of $k_i$, into $(k'_1)_0$, $(k'_1)_1$, $(k'_1)_2$, and $(k'_1)_3$, and allocate each divided part to a slot. In a case where a hash value of a key is 160 bits, the electronic apparatus 100 may divide the hash value of the key in units of 40 bits and allocate the divided 40 bits to each of four slots. The electronic apparatus 100 may obtain the encoded hash value set 17 of the keys by encoding the hash values of the keys. The electronic apparatus 100 may classify the encoded hash value set 17 of the keys into a plurality of groups and generate the lookup table.

FIG. 6 illustrates a plurality of groups 17-1, 17-2, and 17-3 into which the hash values of the keys are classified and a lookup table 30. For example, the electronic apparatus 100 may classify the hash values of the keys into a plurality of groups 17-1, 17-2, and 17-$n$ based on the hash values or the number of hash values.

For example, in a case where the electronic apparatus 100 classifies the hash values of the keys based on a hash value of 10000, hash values of 0 to 9999 may be classified as a first group 17-1, hash values of 10000 to 19999 may be classified as a second group 17-2, and hash values of 10000×(n−1) or more may be classified as an n-th group 17-$n$. According to an embodiment, in a case where the hash value $k'_i$ including $(k'_i)_0$, $(k'_1)_1$, $(k'_1)_2$, and $(k'_1)_3$ is 50, and a hash value $k'_7$ including $(k'_7)_0$, $(k'_7)_1$, $(k'_7)_2$, and $(k'_7)_3$ is 10030, the electronic apparatus 100 may classify the hash value $k'_i$ as the first group 17-1 and classify the hash value $k'_7$ as the second group 17-2. Alternatively, the electronic apparatus 100 may classify the hash values of the keys based on the number of hash values. For example, the electronic apparatus 100 may classify 20000 hash values as each group. According to an embodiment, in a case where the hash value $k'_i$ including $(k'_1)_0$, $(k'_1)_1$, $(k'_1)_2$, and $(k'_1)_3$ is the first hash value, and a hash value $k'_m$ including $(k'_m)_0$, $(k'_m)_1$, $(k'_m)_2$, and $(k'_m)_3$ is the $2000^{th}$ hash value, the electronic apparatus 100 may classify the hash values $k'_i$ to $k'_m$ as the first group 17-1. Further, in a case where the hash value $k'_7$ including $(k'_7)_0$, $(k'_7)_1$, $(k'_7)_2$, and $(k'_7)_3$ is the $2000^{th}$ hash value, and a hash value $k'_{m+1}$ including $(k'_{m+1})_0$, $(k'_{m+1})_1$, $(k'_{m+1})_2$, and $(k'_{m+1})_3$ is the $4000^{th}$ hash value, the electronic apparatus 100 may classify the hash values $k'_7$ to $k'_{m+1}$ as the second group 17-2.

Further, the electronic apparatus 100 may obtain one encoded hash value from each group and generate the lookup table 30 based on the obtained encoded hash value. For example, as illustrated in FIG. 6, the electronic apparatus 100 may generate the lookup table 30 by obtaining the first encoded hash value from each group. That is, the lookup table 30 may include $(k'_i)_0$, $(k'_1)_1$, $(k'_1)_2$, $(k'_1)_3$, $(k'_7)_0$, $(k'_7)_1$, $(k'_7)_2$, $(k'_7)_3$, . . . , $(k'_2)_0$, $(k'_2)_1$, $(k'_2)_2$, and $(k'_2)_3$. Alternatively, the electronic apparatus 100 may generate the lookup table 30 by obtaining the last encoded hash value of each group.

FIG. 7 illustrates the groups 17-1, 17-2, and 17-$n$ of the encoded hash values and data value sets 23-1, 23-3, and 23-$n$. The electronic apparatus 100 may obtain the data value sets 23-1, 23-2, and 23-$n$ including data values matching the encoded hash values of the keys classified into the plurality of groups. That is, the electronic apparatus 100 may generate a first data value set 23-1 including data values $v_1$ and $v_m$ by matching $v_1$ to the hash value $k'_1$ of the key and matching $v_m$ to the hash value $k'_m$ of the key. Then, the electronic apparatus 100 may generate a second data value set 23-2 including data values $v_7$ and $v_{m+1}$ by matching $v_7$ to the hash value $k'_7$ of the key and matching $v_{m+1}$ to the hash value $k'_{m+1}$ of the key. In addition, the electronic apparatus 100 may encrypt and store the data value matching the encoded hash value included in each group. Then, the electronic apparatus 100 may store the generated lookup table.

Figure 8:
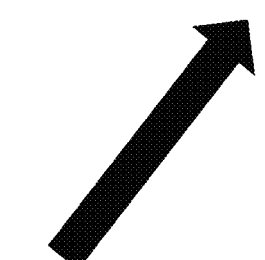
FIGS. 8 and 9 are diagrams for describing a process of retrieving data according to an embodiment of the disclosure.
Figure 9:
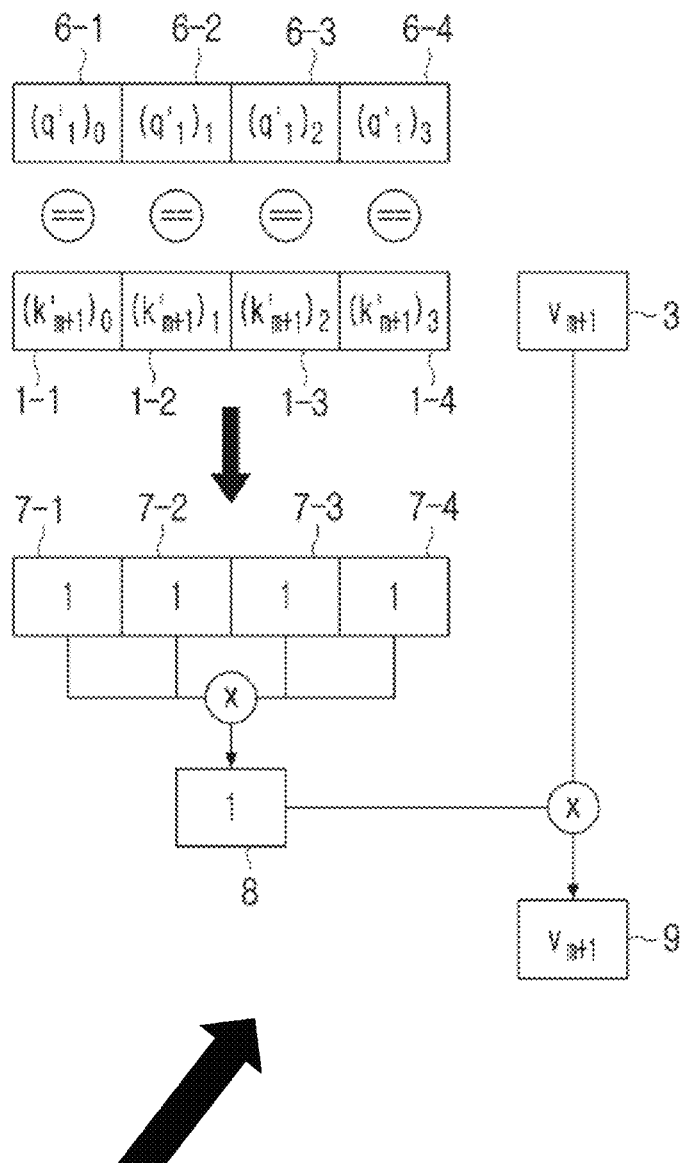

FIGS. 8 and 9 are diagrams for describing a process of retrieving data according to an embodiment of the disclosure.

The electronic apparatus 100 may receive a retrieval query requesting a stored data value from the external apparatus 200. The retrieval query may include information regarding a key corresponding to the data value. The electronic apparatus 100 may generate a hash value of the retrieval query from the retrieval query by using a hash function. The hash function for generating a hash value of a retrieval query may be the same as the hash function for generating a hash value of a key of data. The electronic apparatus 100 may encode the hash value of the retrieval query. That is, the electronic apparatus 100 may divide bits of the hash value of the retrieval query into a predetermined number and allocate the divided bits to each slot. Since the hash function for generating a hash value of a retrieval query and the hash function for generating a hash value of a key are the same, the size (or length (for example, the number of bits)) of a hash value of a key may be the same as a size of a hash value of the retrieval query. Accordingly, the divided size and the number of slots of a hash value of a retrieval query may be the same as the divided size and the number of slots of a hash value of a key.

As illustrated in FIG. 8, the electronic apparatus 100 may compare an encoded hash value 60 of a retrieval query with encoded hash values of keys included in the lookup table 30. According to an embodiment, the electronic apparatus 100 may compare the encoded hash value 60 of the retrieval query with the encoded hash values of the keys included in the lookup table 30 on a slot-by-slot basis. According to an embodiment, the encoded hash value of the retrieval query $((q'_1)_0$, $(q'_1)_1$, $(q'_1)_2$, and $(q'_1)_3)$ may be larger than the hash value of the key $k_1((k'_1)_0$, $(k'_1)_1$, $(k'_1)_2$, and $(k'_1)_3)$ and may be smaller than the hash value of the key $k_m$ $((k'_m)_0$, $(k'_m)_1$, $(k'_m)_2$, and $(k'_m)_3)$. In a case where the lookup table 30 is generated with a hash value at the foremost position of each group, a data value corresponding to the hash value of the retrieval query may be included in the first group. Alternatively, in a case where the lookup table 30 is generated with a hash value at the rearmost position of each group, the data value corresponding to the hash value of the retrieval query may be included in the second group. Accordingly, the electronic apparatus 100 may check a group including the data value corresponding to the retrieval query by using the lookup table 30.

In a case where the lookup table 30 is generated with the hash value of the rearmost position of each group, the data value corresponding to the hash value of the retrieval query may be included in the second group. Therefore, the electronic apparatus 100 may compare the encoded hash values of the keys included in the second group with the encoded hash value 60 of the retrieval query.

FIG. 9 illustrates a process of comparing the encoded hash value of the retrieval query with encoded hash values of keys included in one group, and retrieving the data value. According to an embodiment, in a case where the data value corresponding to the encoded hash value of the retrieval query is included in the second group, the electronic apparatus 100 may compare the encoded hash value of the retrieval query and the encoded hash value of each key included in the second group. As described above, the electronic apparatus 100 may compare the encoded hash value 60 of the retrieval query with encoded hash values of keys by using the homomorphic encryption comparison operation on a slot-by-slot basis.

Referring to FIG. 9, the electronic apparatus 100 may compare encoded partial hash values $(q'_1)_0$, $(q'_1)_1$, $(q'_1)_2$, and $(q'_1)_3$ included in the respective slots 6-1, 6-2, 6-3, and 6-4 of the retrieval query with corresponding encoded partial hash values $(k'_{m+1})_0$, $(k'_{m+1})_1$, $(k'_{m+1})_2$, and $(k'_{m+1})_3$ included in the respective slots 1-1, 1-2, 1-3, and 1-4 of the key by using the homomorphic cryptographic comparison operation. In a case where the hash values of the slots are the same, the operation result may be 1, and in a case where the hash values of the slots are different, the operation result may be 0. The electronic apparatus 100 may obtain comparison operation result values for all slots and perform a multiplication operation (or AND operation) on the comparison operation result values of all slots. In a case where the hash values of all slots are the same, the operation result values 7-1, 7-2, 7-3, and 7-4 of all slots may be 1. Then, a result value 8 of 1 may be obtained by the electronic apparatus 100 performing a multiplication operation (or AND operation) on the comparison operation result values of all slots. Obtaining the result value of 1 may mean that the encoded partial hash values of all slots of the retrieval query and the corresponding encoded partial hash values of all slots of the key are the same, and the hash value of the key corresponding to the hash value of the retrieval query is the same. Since the hash value is generated using the same hash function, the information regarding the key included in the retrieval query and the retrieved key may be the same. Accordingly, the data value requested by the retrieval query may be a data value matching the retrieved key.

The electronic apparatus 100 may multiply the comparison operation result value by a data value $(v_{m+1})$ 3 matching the encoded hash value of the key based on 1 being obtained as the comparison operation result value. Further, the electronic apparatus 100 may determine an operation result value $(v_{m+1})$ 9 as the data value requested in the retrieval query. The electronic apparatus 100 may transmit the determined data value to the external apparatus 200.

Hereinabove, various embodiments of managing and retrieving encrypted data by using a homomorphic encryption lookup table have been described. Hereinafter, the data management method will be described.

Figure 10:
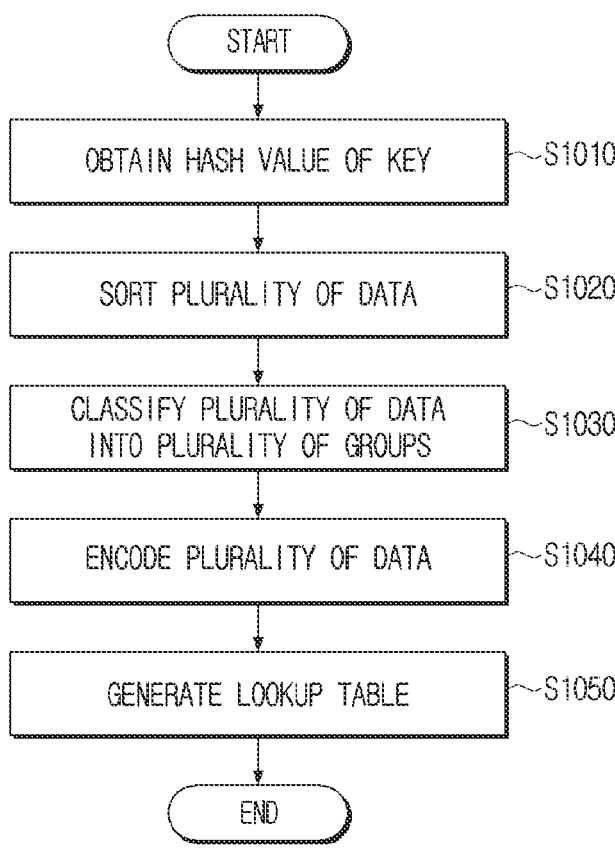
FIG. 10 is a flowchart for describing a data management method according to an embodiment of the disclosure.

FIG. 10 is a flowchart for describing the data management method according to an embodiment of the disclosure.

Referring to FIG. 10, the electronic apparatus may obtain a hash value of a key (S1010). The electronic apparatus may obtain the hash value of the key by using a hash function predetermined for each of a plurality of data. Each data may include one data value matching one key.

The electronic apparatus may sort the plurality of data (S1020). The electronic apparatus may sort the plurality of data changed to hash values of keys based on the obtained hash value. For example, the electronic apparatus may sort the plurality of data in descending or ascending order. Then, the electronic apparatus may classify the plurality of data into a plurality of groups (S1030). The electronic apparatus may classify the plurality of data sorted according to a predetermined criterion into the plurality of groups. For example, the electronic apparatus may classify the plurality of data based on the hash value or the number of hash values.

The electronic apparatus may encode the plurality of data (S1040). The electronic apparatus may divide bits of a hash value of each of the plurality of data into a predetermined number and allocate the divided bits to each slot. Then, the electronic apparatus may generate the lookup table (S1050). The electronic apparatus may generate the lookup table based on a predetermined hash value included in each of the plurality of classified groups. For example, the electronic apparatus may obtain a hash value included in data at the foremost position or a hash value included in data at the rearmost position from each of the plurality of groups. Further, the electronic apparatus may generate and store the lookup table including the hash value obtained from each of the plurality of groups. In addition, the electronic apparatus may encrypt and store the plurality of encoded data classified into the plurality of groups.

The electronic apparatus may retrieve stored data according to the request from the external apparatus and transmit the retrieved data value to the external apparatus.

The electronic apparatus may receive a data retrieval query from the external apparatus. The electronic apparatus may obtain a hash value of the retrieval query from the received retrieval query by using a predetermined hash function. The hash function for obtaining a hash value of a retrieval query may be the same as the hash function for obtaining a hash value of a key.

The electronic apparatus may encode the obtained hash value of the retrieval query. For example, the electronic apparatus may divide bits of the hash value of the retrieval query into a predetermined number and allocate the divided bits to each slot.

The electronic apparatus may obtain a corresponding data value based on the encoded hash value of the retrieval query. The electronic apparatus may determine one of the plurality of groups based on the obtained hash value of the retrieval query and the hash values of the keys included in the lookup table. For example, the electronic apparatus may compare the encoded hash value of the retrieval query with the encoded hash values of the keys included in the lookup table on a slot-by-slot basis, and determine one group. Then, the electronic apparatus may compare bits of a slot to which the hash value of the retrieval query is allocated with bits of a slot to which the hash value of each of the plurality of data included in the determined group is allocated by using the homomorphic encryption comparison operation on a slot-by-slot basis. In a case where the bits of the slot to which the hash value of the retrieval query is allocated coincide with the bits of the slot to which the hash value of the data included in the determined group is allocated, a comparison result value of 1 may be obtained. In a case where an AND operation result value obtained by performing the AND operation on the comparison result value obtained from each slot is 1, the electronic apparatus may obtain the data value by multiplying a data value matching the hash value of the data by the AND operation result value.

The data management method according to various embodiments described above may be provided as a computer program product. The computer program product may include a software (S/W) program itself or a non-transitory computer readable medium in which the S/W program is stored.

The non-transitory computer readable medium is not a medium that stores data for a while, such as a register, a cache, a memory, or the like, but means a medium that semi-permanently stores data and is readable by a device. In detail, the various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

In addition, although embodiments of the disclosure have been illustrated and described hereinabove, the disclosure is not limited to the specific embodiments described above, but may be variously modified by those skilled in the art to which the disclosure pertains without departing from the gist of the disclosure as disclosed in the accompanying claims. These modifications are to be understood to fall within the scope and spirit of the disclosure.

What is claimed is:

1. A data management method comprising:

obtaining a hash value of a key by using a predetermined hash function for each of a plurality of data in which the key matches a data value;

sorting the plurality of data in which the key is changed to the hash value of the key based on the obtained hash value;

classifying the plurality of sorted data into a plurality of groups according to a predetermined criterion;

encoding the plurality of data classified into the plurality of groups; and generating a lookup table based on a predetermined hash value included in each of the plurality of classified groups, after generating the lookup table, receiving a data retrieval query from an external apparatus;

obtaining a hash value of the data retrieval query from the received data retrieval query by using the predetermined hash function;

encoding the obtained hash value of the data retrieval query; and obtaining a corresponding data value based on the encoded hash value of the data retrieval query, wherein in the obtaining of the data value, one of the plurality of groups is determined based on the obtained hash value of the data retrieval query and the hash values of the keys included in the lookup table.

2. The data management method as claimed in claim 1, further comprising encrypting the plurality of encoded data.

3. The data management method as claimed in claim 1, wherein in the classifying of the plurality of sorted data into the plurality of groups, the plurality of data are classified based on the hash value or the number of hash values.

4. The data management method as claimed in claim 1, a homomorphic ciphertext file being configured to store a plurality of homomorphic ciphertexts in a plurality of slots, wherein in the encoding, bits of a hash value of each of the plurality of data are divided into a predetermined number, and the divided bits are allocated to each slot of the plurality of slots.

5. The data management method as claimed in claim 1, wherein in the generating of the lookup table, obtaining a first hash value included in a last position within a preset group among the plurality of groups, obtaining a second hash value included in a foremost position within a group next to the preset group, and generating the lookup table including any one of the obtained first hash value and the obtained second hash value.

6. The data management method as claimed in claim 1, a homomorphic ciphertext file being configured to store a plurality of homomorphic ciphertexts in a plurality of slots, wherein in the obtaining of the data value, bits of the hash value of the data retrieval query are divided into a predetermined number, the divided bits are allocated to each slot of the plurality of slots, and bits of a slot to which the hash value of the data retrieval query is allocated are compared with bits of a slot to which the hash value of each of the plurality of data included in a determined group is allocated by using a homomorphic encryption comparison operation on a slot-by-slot basis.

7. The data management method as claimed in claim 6, wherein in the obtaining of the data value, in a case where the bits of the slot to which the hash value of the data retrieval query is allocated coincide with the bits of the slot to which the hash value of the data included in the determined group is allocated, a comparison result value of 1 is obtained, and in a case where an AND operation result value obtained by performing an AND operation on the comparison result value obtained from each slot is 1, the data value is obtained by multiplying a data value matching the hash value of the key by the AND operation result value.

8. An electronic apparatus comprising:

a communication interface; and a processor, wherein the processor is configured to obtain a hash value of a key by using a predetermined hash function for each of a plurality of data in which the key matches a data value, sort the plurality of data in which the key is changed to the hash value of the key based on the obtained hash value, classify the plurality of sorted data into a plurality of groups according to a predetermined criterion, encode the plurality of data classified into the plurality of groups, and generate a lookup table based on a predetermined hash value included in each of the plurality of classified groups, the processor is configured to control the communication interface to receive a data retrieval query from an external apparatus, after generating the lookup table, obtain a hash value of the data retrieval query from the received data retrieval query by using the predetermined hash function, encode the obtained hash value of the data retrieval query, and obtain a corresponding data value based on the encoded hash value of the data retrieval query, wherein the processor is configured to determine one of the plurality of groups based on the obtained hash value of the data retrieval query and the hash values of the keys included in the lookup table.

9. The electronic apparatus as claimed in claim 8, wherein the processor is configured to encrypt the plurality of encoded data.

10. The electronic apparatus as claimed in claim 8, wherein the processor is configured to classify the plurality of data based on the hash value or the number of hash values.

11. The electronic apparatus as claimed in claim 8, a homomorphic ciphertext file being configured to store a plurality of homomorphic ciphertexts in a plurality of slots, and wherein the processor is configured to divide bits of a hash value of each of the plurality of data into a predetermined number and allocate the divided bits to each slot of the plurality of slots.

12. The electronic apparatus as claimed in claim 8, wherein the processor is configured to obtain a first hash value included in a last position within a preset group among the plurality of groups, to obtain a second hash value included in a foremost position within a group next to the preset group, and to generate the lookup table including any one of the obtained first hash value and the obtained second hash value.

13. The electronic apparatus as claimed in claim 8, a homomorphic ciphertext file being configured to store a plurality of homomorphic ciphertexts in a plurality of slots, and wherein the processor is configured to divide bits of the hash value of the data retrieval query into a predetermined number, allocate the divided bits to each slot of the plurality of slots, and compare bits of a slot to which the hash value of the data retrieval query is allocated with bits of a slot to which the hash value of each of the plurality of data included in a determined group is allocated by using a homomorphic encryption comparison operation on a slot-by-slot basis.

14. The electronic apparatus as claimed in claim 13, wherein the processor is configured to obtain a comparison result value of 1 in a case where the bits of the slot to which the hash value of the data retrieval query is allocated coincide with the bits of the slot to which the hash value of the data included in the determined group is allocated, and is configured to obtain the data value by multiplying a data value matching the hash value of the key by an AND operation result value in a case where the AND operation result value obtained by performing an AND operation on the comparison result value obtained from each slot is 1.

15. A non-transitory computer-readable recording medium which includes a program for executing a method for data management wherein the method includes:

obtaining a hash value of a key by using a predetermined hash function for each of a plurality of data in which the key matches a data value;

sorting the plurality of data in which the key is changed to the hash value of the key based on the obtained hash value;

classifying the plurality of sorted data into a plurality of groups according to a predetermined criterion;

encoding the plurality of data classified into the plurality of groups; and generating a lookup table based on a predetermined hash value included in each of the plurality of classified groups, after generating the lookup table, receiving a data retrieval query from an external apparatus;

obtaining a hash value of the data retrieval query from the received data retrieval query by using the predetermined hash function;

encoding the obtained hash value of the data retrieval query; and obtaining a corresponding data value based on the encoded hash value of the data retrieval query, wherein in the obtaining of the data value, one of the plurality of groups is determined based on the obtained hash value of the data retrieval query and the hash values of the keys included in the lookup table.

16. The non-transitory computer-readable recording medium as claimed in claim 15, wherein in the classifying of the plurality of sorted data into the plurality of groups, the plurality of data are classified based on the hash value or the number of hash values.

* * * * *